May 10, 1932.  A. M. BABITCH  1,857,675

FUEL AND AIR PUMP

Filed July 7, 1928

Inventor

Abraham M. Babitch

By Blackmore, Spencer & Flint

Attorneys

Patented May 10, 1932

1,857,675

UNITED STATES PATENT OFFICE

ABRAHAM M. BABITCH, OF FLINT, MICHIGAN, ASSIGNOR TO A C SPARK PLUG COMPANY, OF FLINT, MICHIGAN, A COMPANY OF MICHIGAN

FUEL AND AIR PUMP

Application filed July 7, 1928. Serial No. 290,962.

Air filled conduits being used to connect fuel tanks with instruments for indicating the fuel level therein, this invention relates primarily to means for replenishing the air in the connecting lines or conduits of hydrostatic liquid level indicating systems of the general character referred to.

Referring to an incidental showing and description in my copending application S. N. 239,477, filed December 12, 1927, it is one object of this invention to so modify parts of a reciprocating pump, such as a diaphragm type single-acting fuel pump, that the normally non-working side of the diaphragm is used in pumping air; and this object is preferably accomplished by the provision of suitably valved openings and passages, communicating with what becomes an air chamber, beneath the pump diaphragm,—one type of pump suitable for modification and use in the manner here referred to being more fully described in my copending application S. N. 123,370, filed July 19, 1926.

As is well known, the volume of air or gas in the line may tend to change as a result of leaks, absorption of the air into the liquid fuel, and/or by reason of temperature fluctuations; and it is accordingly proposed, by the present invention, to provide means, preferably involving the use of a diaphragm fuel pump of a highly efficient type (the length of its stroke being dependent upon the pressure in the fuel delivery line), to so replenish the air or gas in the mentioned conduit as to maintain, assuming a given level of fuel in the fuel tank, a substantially constant volume of air or gas in said conduit.

The phrase "hydrostatic liquid level indicating systems" is herein used to refer to those systems that depend upon the pressure or head of liquid in a tank to retain under compression a column of air in a pipe or other conduit leading to any suitable gauge or analogous instrument,—presumably located with reference to convenient inspection. In order that such a gauge or instrument may give consistent indications or other reactions, it is well known to be necessary that the conduit or line leading to the gauge or instrument be completely filled with air or other suitable gas; and the objects of this invention include not only the provision of improved means for the pumping of air incidentally to the pumping of fuel, but the provision of a bell at the lower end of the mentioned conduit and the use of an additional conduit for the downward delivery of air thereto at such a rate as substantially to exclude the liquid fuel from said bell.

Other objects of this invention, including the provision of an air-receiving bell which has specific conduit connection, and the provision of a novel combined liquid and gas pump of diaphragm type, all functions of said pump being responsive, in point of efficiency, to variations in pressure within a pump chamber, may be best appreciated from the following description of preferred and alternative embodiments thereof taken in connection with the appended claims and the accompanying drawings.

Fig. 1 may be referred to as a median vertical section through an improved pump illustrating this invention, this view being so taken as to show valves for controlling the advance of air into and for the exit of air from a lower or air pump chamber.

Figure 3:
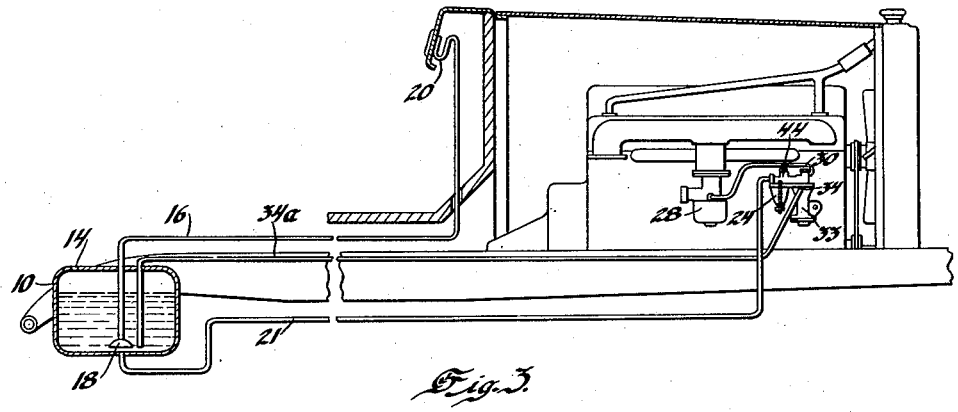
Fig. 3 is a diagrammatic elevational view showing one advantageous arrangement of parts in a complete fuel pumping and level indicating system suitable for use upon an automobile.
Figure 4:
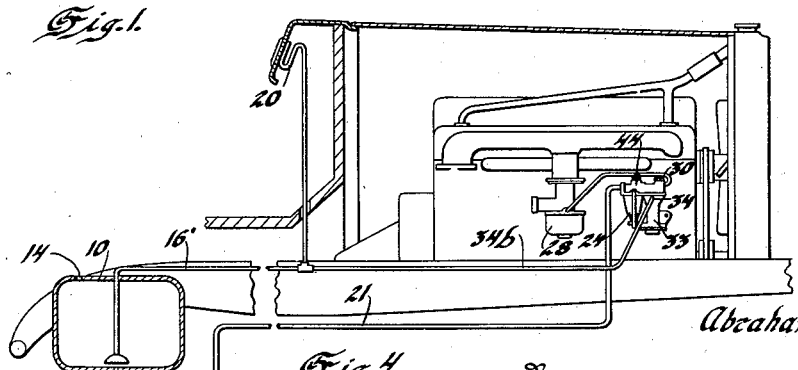

Fig. 4, comparable with Fig. 3, shows a slightly modified system as applied to an automobile.

Figures 1, 2:
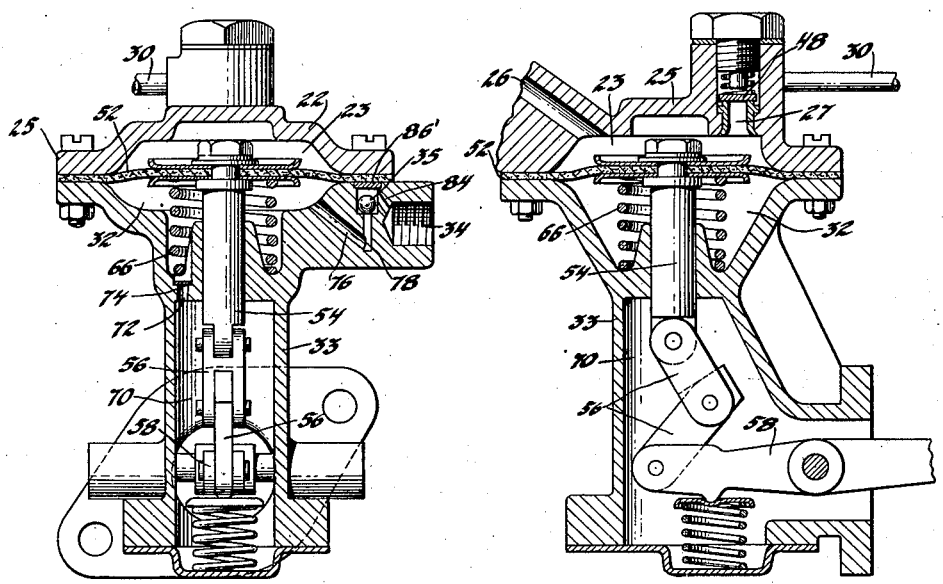
Fig. 2 is a side view of the pump shown in Fig. 1, this view showing one available type of operating means therefor.

Referring to the details of that specific embodiment of this invention illustrated in Figs. 1–3 inclusive, a fuel tank 10 is shown as provided with a vent 14, suitable to permit the escape of any excess of air pumped into said tank; and a pipe or conduit 16 is shown as extending upward from a point near the bottom of said tank, where it is preferably provided with an enlargement or bell 18,—adapted to so trap and retain a considerable volume of air that slight changes therein become unimportant. The pipe 16 may lead to any preferred form of pressure gauge or similar instrument, as diagrammatically represented by a mere U-tube or manometer 20, which may be mounted upon any instrument board or the like. Pressure due to the hydrostatic head of fuel or other liquid in the tank 10 compresses the air in the bell 18 and the pipe 16, such pressure being transmitted to the instrument 20. Thus, assuming that the bell 18 is always substantially full of air or other gas, so that the contact level between the liquid and the gas corresponds with the lower edge of the bell 18, the pressure indicated by the gauge is substantially proportional to the head of liquid in the tank, said gauge then serving to show directly or indirectly the volume of liquid that the tank contains.

A fuel line 21 is shown as having one of its ends in communication with the bottom of the tank 10 and its other end in communication (preferably by way of a filter, not shown in detail) with a fuel pump 22 comprising a fuel pump chamber 23. This chamber and a support for a filter and/or sight cup 24 may be provided by a single cover casting 25; and this casting may provide both an inlet passage 26 and an outlet passage 27,—from which a fuel delivery line may lead to a carburetor 28.

An air pump chamber 32 provided in a main casting 33 of this combined fuel and air pump is shown in Fig. 3 as having its outlet 34 in communication, by a second conduit or pipe 34ª, with a bell 18; and the lower end of this pipe 34ª, referred to as part of a preferred means for feeding air to the bell 18, may be secured thereto in substantially the same general manner as the lower end of the pipe 16, shown extending parallel therewith.

A full description of one suitable operating mechanism for a pump of the general character herein described being given in the above mentioned copending application S. N. 123,370, only a brief résumé thereof need be here given: Fuel entering through the filter cup 24 passes a check valve at 44 to enter the pump chamber 23 through an inlet passage; and upon the upward stroke of any suitable reciprocatory pumping element it is forced past an additional check valve 48, into the line 30, and thence toward the float chamber of a carburetor or an equivalent element interposed in a path extending to a point of utilization. The reciprocating element of the illustrated pump is a flexible fuel-impervious diaphragm 52, shown as connected by means comprising a rod 54 and links 56 with an oscillatory lever 58. The latter may be operated by means such as a suitable cam, not shown, located upon or driven by a rotating part of an engine. In this pump, in order to render its efficiency dependent upon (and inversely proportional at certain times to) pressure built up in the line 30, the intake stroke being effected by a pulling of the diaphragm downward (by means such as the rod 54 and links 56), energy thereby stored in a compression spring 66 is relied upon to advance the diaphragm for the discharge stroke. Many modifications are obviously possible in the pump and pump operating structure referred to without affecting the described novel construction and use of a combined fuel and air pump.

The illustrated fuel pump having been originally designed as a single-acting, pressure-responsive pump, a lower chamber 32 thereof has heretofore performed no useful function; but the present invention, in a preferred form thereof, involves a modification and use of this chamber in order to provide an air pump chamber for the purposes above referred to, or for like purposes. A chamber 70, which may open into a crank case (not shown) and/or into the outer atmosphere, is shown as communicating with the chamber 32 by means of an intake passage 72 controlled by a check valve 74; and an inclined outlet passage 76 is shown as communicating with an intermediate and preferably vertical passage 78, in which is retained the check valve 35,—another inclined passage 84 being in communication with the passage 78 above the valve 35, and in communication with the air outlet 34. Means such as the diaphragm 52, below which a small disk 86' is optionally pressed into a suitable opening in the pump body, may be employed to retain the ball 35; and the check valve 74 is shown as incidentally retained by the mentioned fuel-expelling spring 66.

If desired, connections may alternatively be arranged somewhat as suggested in Fig. 4, wherein an air line 34ᵇ leads from the air pump chamber directly to the conduit 16'. This alternative construction may obviously make for economy in piping, and it is equally effective in the replenishment of air. However, the preferred form, as first described above, has the advantage that in case the check valve 35, or its equivalent, fails to close no error in the gauge reading need result.

As air is pumped through the line 34ª or 34ᵇ any surplus escapes, in either case, past the downwardly-disposed edge of the bell 18 to the exit through vent 14 in tank 10,—the bell and line being always kept filled with air or other gas fed downwardly to said bell.

From the foregoing description it will be understood that, the cover casting 25 being provided with valved inlet and outlet passages for the fuel pump chamber 23, and the main casting 33 being provided with air inlet and outlet passages, during each fuel-expelling or upward stroke of the reciprocatory diaphragm 52, or its equivalent, air is incidentally drawn into the air pump chamber 32, past the valve 74; and that, incidentally into the fuel intake stroke, air is discharged past the valve 35 into the second conduit pipe 34$^a$ (or 34$^b$) to fill the pressure transmitting conduit or line 16 (or 16') and the bell 18, parallel vertical ends of said conduits communicating with said bell above the lower and uninterrupted edge thereof. Thus, so long as fuel is being pumped from the tank 10, a correct indication of the instrument 20, or its equivalent, is assured.

Although the foregoing description includes but one type of combined fuel and air pump, this being obviously capable of alternative uses, and but two fuel handling and indicating systems to which such a pump is adapted, it will be obvious that numerous modifications of this invention might easily be devised without the slightest departure from the spirit and scope of this invention, as the same is indicated above and in the following claims.

I claim:

1. In means for simultaneously pumping air and a liquid fuel, a main casting providing an air pump chamber, a cover casting providing a fuel pump chamber, a reciprocable diaphragm pumping element secured between said castings and adapted to displace air and fuel from said chambers alternately, means for reciprocating said diaphragm, there being a separate inlet opening to each of said chambers, and a separate valved outlet opening from each of said chambers, one pair of said openings being provided in said cover casting and another pair of said openings being so provided in said main casting as to be accessible only upon the removal of said cover casting.

2. A pump which comprises a pump chamber and a diaphragm, said chamber being provided with an inlet containing a valve, and which said chamber contains a spring for advancing said diaphragm, the spring serving for the incidental retention of said valve.

3. A pump comprising a main casting and a cover casting, a diaphragm, a pumping chamber formed by said diaphragm and one of said castings, a passage from said chamber through said one casting providing for an exterior connection thereto, and a valve in said passage, said valve being retained by the other casting and accessible only on removal thereof.

In testimony whereof I affix my signature.

ABRAHAM M. BABITCH.